United States Patent
Eronen et al.

(10) Patent No.: US 8,452,344 B2
(45) Date of Patent: May 28, 2013

(54) METHOD AND DEVICE FOR EMBEDDING EVENT NOTIFICATION INTO MULTIMEDIA CONTENT

(75) Inventors: Antti Eronen, Tampere (FI); Pauli Laine, Espoo (FI)

(73) Assignee: Nokia Corporation, Espoo (FI)

( * ) Notice: Subject to any disclaimer, the term of this patent is extended or adjusted under 35 U.S.C. 154(b) by 717 days.

(21) Appl. No.: 12/064,749

(22) PCT Filed: Aug. 25, 2005

(86) PCT No.: PCT/IB2005/002538
§ 371 (c)(1),
(2), (4) Date: Jul. 10, 2008

(87) PCT Pub. No.: WO2007/023331
PCT Pub. Date: Mar. 1, 2007

(65) Prior Publication Data
US 2008/0268911 A1    Oct. 30, 2008

(51) Int. Cl.
H04M 1/00    (2006.01)
H04M 19/04   (2006.01)

(52) U.S. Cl.
CPC .................................. H04M 19/04 (2013.01)
USPC ........ 455/567; 382/154; 379/93.05; 709/204; 717/106; 725/58; 725/108

(58) Field of Classification Search
CPC .................................................... H04M 19/04
USPC ........ 455/567, 556; 725/108, 58; 379/93.05; 382/154; 709/204; 715/233, 719; 719/311; 717/106, 125
See application file for complete search history.

(56) References Cited

U.S. PATENT DOCUMENTS

| 5,852,654 | A  | * | 12/1998 | Song ........................... 379/93.05 |
| 6,226,785 | B1 | * | 5/2001  | Peterson et al. ............... 717/106 |
| 6,813,776 | B2 | * | 11/2004 | Chernock et al. ............... 725/58 |
| 7,464,381 | B1 | * | 12/2008 | Nickerson et al. ............ 719/311 |
| 7,721,264 | B2 | * | 5/2010  | Peterson et al. ............. 717/125 |
| 2002/0045438 | A1 |   | 4/2002  | Tagawa et al. |
| 2003/0086604 | A1 | * | 5/2003  | Oniyama ....................... 382/154 |
| 2003/0100347 | A1 | * | 5/2003  | Okada et al. .................. 455/567 |
| 2003/0159150 | A1 | * | 8/2003  | Chernock et al. ............... 725/58 |
| 2004/0117843 | A1 | * | 6/2004  | Karaoguz et al. ............. 725/108 |
| 2005/0070241 | A1 |   | 3/2005  | Northcutt et al. |

(Continued)

FOREIGN PATENT DOCUMENTS

| FR | 2 865 602  | A |   | 7/2005 |
| GB | 2320117    | A |   | 6/1998 |
| JP | 2004-265354 |   | * | 9/2004 |

OTHER PUBLICATIONS

Supplementary European Search Report for EP 05 78 2442 completed Nov. 23, 2009.

(Continued)

*Primary Examiner* — William D Cumming
(74) *Attorney, Agent, or Firm* — Alston & Bird LLP (57) ABSTRACT

Methods and apparatuses for embedding event notification into multimedia content being reproduced on an electronic device are provided herein. The method may include causing reproduction of multimedia content on said electronic device, detecting an event that requires notification of a user of said electronic device and responsive thereto applying a modification to said reproduction of said multimedia content, according to said event, wherein said modification achieves a user-perceivable variation in said reproduced multimedia content.

29 Claims, 3 Drawing Sheets

U.S. PATENT DOCUMENTS

| | | | |
|---|---|---|---|
| 2005/0172154 A1 | 8/2005 | Short et al. | |
| 2006/0010420 A1* | 1/2006 | Peterson et al. | 717/106 |
| 2008/0268911 A1* | 10/2008 | Eronen et al. | 455/567 |
| 2009/0210789 A1* | 8/2009 | Thakkar et al. | 715/719 |
| 2009/0282103 A1* | 11/2009 | Thakkar et al. | 709/204 |
| 2010/0241947 A1* | 9/2010 | Dahn et al. | 715/233 |

OTHER PUBLICATIONS

International Preliminary Report on Patentability for PCT/IB2005/002538 dated Feb. 26, 2008.

PCT/US2005/002538 International Search Report, dated May 2, 2006.

PCT/US2005/002538 Written Opinion, dated May 2, 2006.

First Office Action in Chinese Application No. 200580051265.3 dated Apr. 29, 2010.

Office Action from related Chinese Patent Application No. 200580051265.3, issued Jan. 6, 2011.

* cited by examiner

METHOD AND DEVICE FOR EMBEDDING EVENT NOTIFICATION INTO MULTIMEDIA CONTENT

The present invention relates to a method and device for embedding a notification about an event into multimedia content, wherein said content is reproduced on an electronic device. It particularly relates to modifying a reproduced audio content responsive to an incoming call on a mobile communication device.

PRIOR ART

In conventional mobile phones and like devices incoming calls or similar events are indicated to the user by interrupting any currently reproduced multimedia content. A very common example would be a user listening to an mp3-track with his mobile phone when a call comes in. In conventional phones the mp3-track will be interrupted immediately and the ring tone or alert tone of the phone will be sounded.

This can be rather disturbing for a user, as the listening experience is abruptly destroyed. Imagine a user taking a nip on his lunch break, listening to some nice relaxing tune. Suddenly switching to the ring tone in such a situation can be rather annoying, particularly when the ring tone is anything but relaxing, say some heavy metal song.

Therefore a common way of dealing with such situations would be simply turning off the ring tone at all. This is of course unacceptable, as it will most certainly lead to the user missing any incoming call or message, even if it is urgent.

There is an increasing market for mobile phones with music player functionality. This in turn entails that many people will spend time listening to music with their mobile phones. When an incoming call or like occurs the phone has to notify the user about this event. It should be apparent that in a music-enabled terminal device abruptly interrupting the music with an alert tone, or simply playing an alert tone on top of the (then background) music is not a preferable method.

The above mentioned problem also applies to other multimedia content other than music, for example to a computer game played on a game deck like the Nokia N-Gage®. It will be rather frustrating for a user when he is in an important stage of the game and is then distracted by any alarm, ring tone or like. Such distraction can be so disturbing that the player will actually fail at an important moment of the game. Imagine a player attempting to perform some jump requiring his full attention in order not to fall off a cliff, or a player in a first person shooter waiting for an opponent to appear behind a corner. The player might miss the jump or be surprised by his opponent when being distracted by a ring tone, which is apparently unwanted.

It is even conceivable that an unexpectedly played ring tone or like might cause dangerous reactions of the distracted user in real-life situations, leading to injuries of the user. However, it is much more likely that a user will accidentally drop a mobile device in such a situation, which can at least lead to damaging the device.

It is previously known that the music is faded out before the ring tone is actually played. While this can help to reduce the level of the disturbance caused by the interruption it does not really solve the problem of such event-triggered interruptions. It particularly does not enable a user to "ignore" the incoming call or like when he is currently not willing to answer. In the manner just described he will instead be forced to restart the reproduction of the audio track after having refused the call.

Therefore there is an apparent need for a method and a device for performing a notification of a user of an electronic device about certain events, wherein the notification is embedded within currently reproduced multimedia content to avoid any distractions of the user. It is an object of the invention to provide means for ensuring that a user of an electronic device will be informed about any important event, while the user is still enabled to "ignore" the notification easily enough if he is not willing to let him be distracted at the moment. He can then take care of the notified event later, maybe after having finished listening to the current audio title, having finished watching a TV show or after having finished a particular level of a computer game.

According to an aspect a method for embedding event notification into multimedia content being reproduced on an electronic device is provided. The method comprises
 reproducing multimedia content on the electronic device;
 detecting an event requiring notification of a user of the electronic device; and responsive thereto
 applying a modification to the reproduction of the multimedia content, according to the event, wherein the modification achieves a user-perceivable variation in the reproduced multimedia content.

The presented invention enables subtle yet clearly audible notification of certain events by adapting multimedia content that is currently reproduced, e.g. a music title playing. The user is notified but is not distracted by the notification. The modification must be noticeable, i.e. distinguishable from "normal" music effects, but still not too disturbing.

In an exemplary embodiment the multimedia content comprises audio content, and the modification comprises at least one of
 amplitude modulation;
 pitch modulation;
 tempo modulation;
 adding a reverb effect to the audio content;
 manipulating an existing reverb effect of the audio content, and
 adding a stereo or surround effect to the audio content.

As will be described in the detailed description there are various ways of performing an audible notification, wherein the above mentioned ones are easy to implement, but provide an effective modification.

In an exemplary embodiment the modification comprises
 analyzing properties of the audio content;
 adapting a notification-related audio content according to the analyzed properties; and
 adding the adapted notification-related audio content to the reproduction of the audio content.

In order to ensure that a notification-related audio content like a ring tone, alert tone or similar fits harmonically into the currently reproduced audio content, it is necessary to analyze certain properties of the audio content, to be able to adapt the notification-related audio content to those properties.

In an exemplary embodiment the analyzed properties comprise at least one of
 the tempo of the audio content;
 the pitch of the audio content;
 the volume of the audio content; and
 the spectral distribution of the audio content.

These properties are the most essential features of a music track and are thus important for the analyzing.

In an exemplary embodiment adapting the notification-related audio content comprises
 calculating a masking curve of the audio content; and
 adapting the level of the notification-related audio content to exceed the masking curve by a pre-determined value.

This ensures that the notification-related audio content will be audible compared to the background music, as its level will so exceed the background enough to be audible, however, not be too prevailing.

In an exemplary embodiment the multimedia content comprises video content, and wherein the modification comprises adding a visual notification to the video content, according to the event. The invention is not restricted to a use with audio content, but can as well be applied to any video, that is, visual content.

In an exemplary embodiment, the visual notification comprises a manipulation of at least one of
the color of the video content;
the brightness of the video content; and
the contrast of the video content.

These are the very basic parameters of a video content and are thus easy to manipulate, while an effective variation can be achieved by suitable manipulation thereof.

In an exemplary embodiment the method comprises
analyzing the video content to detect contiguous faces comprising a substantially uniform color; and
adding the visual notification within the detected faces.

According to this embodiment, faces can be detected that allow for an easy addition of the visual notification, which can e.g. be a text indicating an incoming call. In order for such text to be visible it is advantageous to add it to such faces that comprise a substantially uniform color, which can therefore serve as a background for the notification.

In an exemplary embodiment, the multimedia content is a computer game, and the modification comprises a manipulation and/or generation of game objects according to the event. Computer games are a further example of multimedia content that can advantageously be altered by the present invention, responsive to an event requiring a notification.

In an exemplary embodiment, the computer game uses textures, and the manipulation comprises exchanging textures with textures representing a visual notification according to the event. Many modern computer games make use of so-called graphic engines, wherein the actual appearances of objects are essentially affected by the use of textures. By manipulating such textures, which is an easy task, an effective implementation of notification can be provided. Such exchanging does not put a lot of processing stress onto a CPU of a mobile device as well.

In an exemplary embodiment, the event is an incoming call or an incoming message. These are the most prominent events requiring a user notification that can occur on a mobile communication device like a multimedia-enabled mobile phone. Messages can be SMS, MMS, incoming emails, instant messenger messages or like.

In an exemplary embodiment the method further comprises
terminating the modification of the reproduction of the multimedia content when the incoming call is hung up or refused.

It should be apparent that the modification is only performed as long as the event is still occurring. In advanced embodiments it is also possible to terminate even when an event is still occurring, e.g. after a pre-set time span, in order not to disturb a user who is obviously not willing to deal with the event right now.

In an exemplary embodiment, the event is a change in an operation condition of the electronic device. Important changes in certain operation conditions are other examples of events that might require a user interaction and should thus be notified to him. Such can e.g. be if a mobile phone leaves the coverage area of a mobile network, leading to the subscriber not being reachable.

In an exemplary embodiment, the electronic device is a battery-powered device and wherein the change in an operation condition is the battery capacity falling below a predetermined threshold. This is a very useful feature for mobile devices with a limited energy supply. It is necessary to inform the user about the fact that the battery capacity is nearly exhausted, for example to give him the opportunity to stop a running computer game in order not to lose the chance of receiving an awaited call or like.

According to another aspect, a computer program product is provided, comprising program code means stored on a computer readable medium for carrying out the method of the invention when the program product is run on a computer or network device.

According to yet another aspect, a computer program product comprising program code is provided, downloadable from a server for carrying out the method of the invention when the program product is run on a computer or network device.

According to still another aspect, an electronic device for embedding event notification into multimedia content being reproduced thereon is provided. The device comprises
a content source component adapted for providing a multimedia content;
a reproduction component adapted for reproducing the multimedia content;
a modification component connected with the reproduction component; and
an event detection component connected with the modification component, the event detection component being adapted for detecting events requiring a notification of a user of the electronic device;
wherein the modification component is adapted for applying a modification to the reproduced multimedia content, responsive to the detection component detecting an event, and wherein the modification achieves a user-perceivable variation in the reproduced multimedia content.

Such a device is required to obtain the advantages explained above. The content source can be for example a music player hardware with an exchangeable storage medium like a MMC-card, an FM tuner, or an analog or digital video receiver like DVB-T or like. The reproduction component can comprise any suitable combination of loudspeaker, earphones, and displays.

In an exemplary embodiment, the multimedia content comprises audio content, and the modification comprises at least one of
amplitude modulation;
pitch modulation;
tempo modulation;
adding a reverb effect to the audio content;
manipulating an existing reverb effect of the audio content; and
adding a stereo or surround effect to the audio content.

In an exemplary embodiment, the multimedia content comprises audio content, and the device further comprises
an analyzing component connected with the modification component, adapted for analyzing properties of the audio content; and
a storage component for storing notification-related audio content;
wherein the modification component is adapted for adapting the stored notification-related audio content according to the analyzed properties; and for adding the adapted notification-related audio content to the reproduction of the audio content.

In an exemplary embodiment, the modification component is adapted for calculating a masking curve of the audio content; and for adapting the level of the notification-related audio content to exceed the masking curve by a pre-determined value.

In an exemplary embodiment, the multimedia content comprises video content, and wherein the modification component is adapted for adding a visual notification to the video content, according to the event.

In an exemplary embodiment, the modification component is adapted for performing a manipulation of at least one of
color,
brightness,
contrast
of the video content, according to the event.

In an exemplary embodiment, the modification component is adapted for analyzing the video content to detect contiguous faces comprising a substantially uniform color; and adding the visual notification within the detected faces.

In an exemplary embodiment, the multimedia content is a computer game, and wherein the modification component is adapted for performing a manipulation and/or generation of game objects according to the event.

In an exemplary embodiment, the computer game uses textures, and wherein the manipulation component is adapted for exchanging textures with textures representing a visual notification according to the event.

In an exemplary embodiment, the event detection component is adapted for detecting an incoming call or an incoming message.

In an exemplary embodiment, the modification component is further adapted for terminating the modification of the reproduction of the multimedia content when the incoming call is hung up or refused.

In an exemplary embodiment, the event detection component is adapted for detecting a change in an operation condition of the electronic device.

In an exemplary embodiment the electronic device is a battery-powered device and wherein said event detection component is adapted for detecting when the battery capacity falls below a predetermined threshold.

BRIEF DESCRIPTION OF THE DRAWINGS

The invention will subsequently be described in detail, and with reference top the attached drawings, which are intended only as non-limiting illustrative examples of preferred embodiments, and in which.

DETAILED DESCRIPTION OF THE INVENTION

With the new mp3-capable mobile devices or like a situation will become more and more common wherein a user listens to some stored music on his mobile device when an incoming call shall be alerted. Instead of stopping the music and playing the ring tone as conventional, the music is not interrupted, but modified in a certain way, e.g. by changing the loudness or pitch of the music. Alternatively, the ring tone can be mixed into the music. However, this is done in a way that adapts the ring tone to the played music: e.g. the tempo or pitch is adapted to match the musical key of the ring tone to that of the currently played music, so that the ring tone will fit harmonically into the played music.

The basic idea of the invention is that the currently played music piece is altered in a noticeable and meaningful way instead of simply playing some alert tone. For incoming call this can mean that no ring tone is actually played, but the currently playing title continues with noticeable amplitude modulation, pitch tremolo, added synchronized percussion or such.

Figure 1:
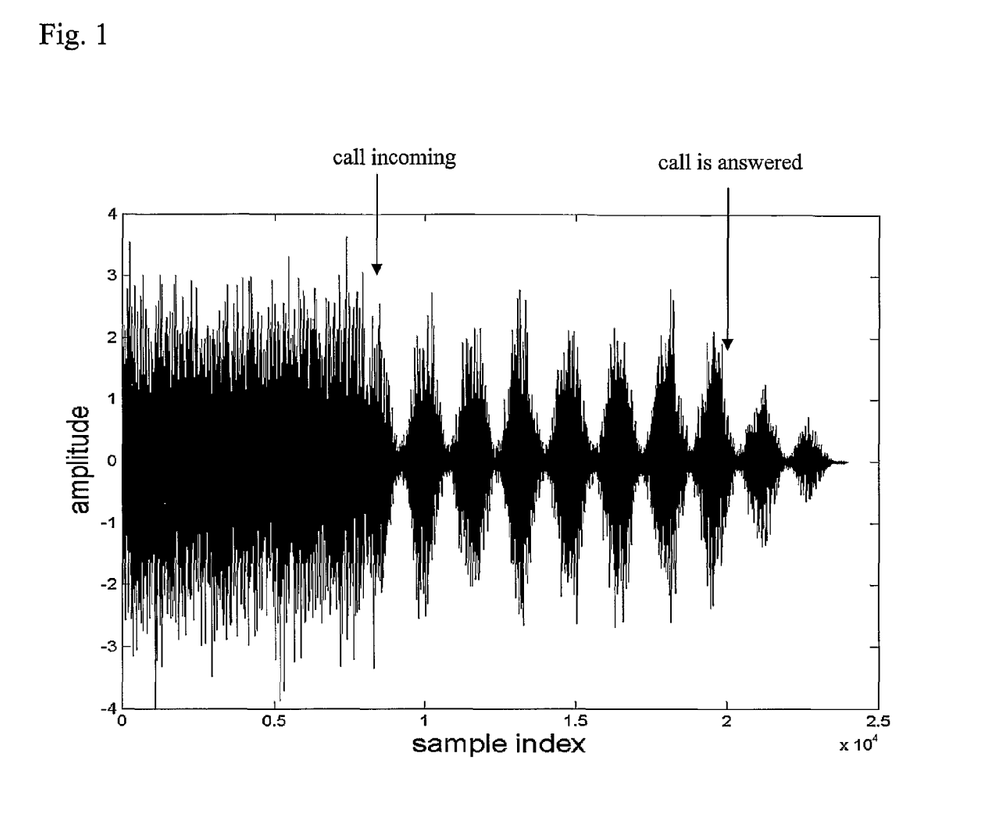
FIG. 1 is a graph displaying an amplitude modulation according to an embodiment of the invention.

In FIG. 1 a simple yet effective embodiment of the method according to the invention is depicted. The figure illustrates a graph showing the amplitude (y-axis) and the time index (x-axis) of a sample audio content being reproduced on some electronic device. This represents the case of a user listening to an audio title. The utilized units are to be understood as arbitrarily. On the left of the graph the unmodified audio sample is shown, comprising a certain average amplitude value. When a call comes in the modification according to the invention is applied to the audio content (here at sample index of about 0.8-0.9). In this figure a sinusoidal modulation of the amplitude of the audio content is shown. However, as will emerge from the later detailed description, there are many other ways of performing this modification.

The user will easily notice the variations in the amplitude. In the example depicted here it is shown that the user actually answers the call (about sample index 2). The audio content will now be faded out in order to allow a handling of the incoming call. However, it is naturally possible for the user to refuse to answer the call. He can then either manually refuse it; or in some embodiments a time span can be pre-programmed after which the modification of the audio content will be terminated irrespective of the user's behavior. If the caller does hang up, this also leads to the modification being terminated.

Figure 2:
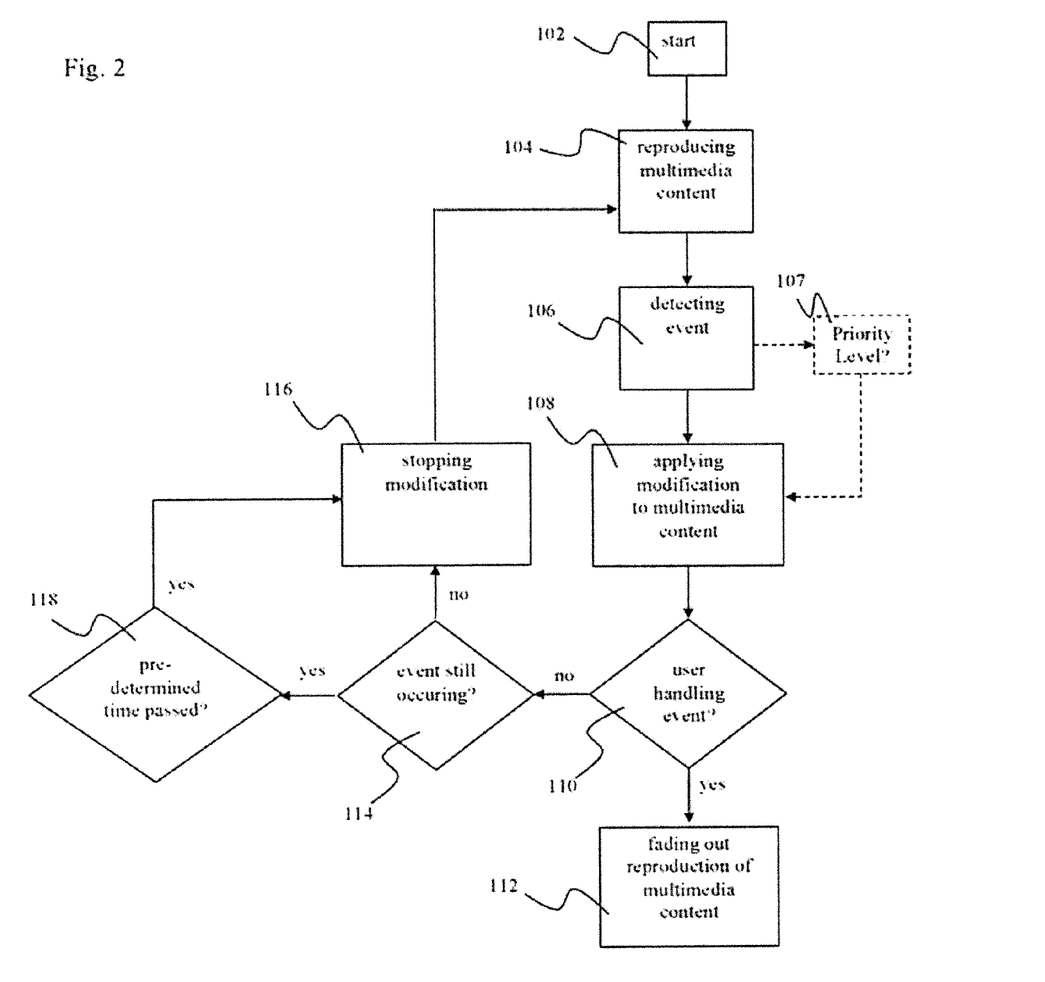
FIG. 2 is a flow chart depicting steps of an embodiment of the method of the invention.

FIG. 2 is a flow chart depicting essential steps of the method of the invention. In step 102 the procedure starts, e.g. a user turns on his mobile device. In step 104 a multimedia content is being reproduced, that is, e.g. the user turns on the music player of his device and starts listening to an mp3 track or like. During the reproduction it is detected, in step 106, if an event occurs which will require notifying the user thereof. Such event can be various events, which will be explained in more detail later on. In a very common case it will be an incoming voice call.

Responsive to the occurrence of the event the modification of the multimedia content will be performed according to the invention, in step 108. The user is now notified about the incoming event by the accordingly performed modification of the currently playing content (which is assumed to be an audio content here, but can be other kinds of multimedia content as will be described later). Therefore it is determined, in step 110, if the user does handle the event, that is, e.g. answers the incoming call. In that case the process is continued with step 112, wherein the audio content is faded out, as already described in conjunction with FIG. 1. It is also possible that the user will refuse the call (not depicted here), which will lead to the modification being terminated and normal playback is then resumed.

If the user does not react the procedure will continue in step 114 with a check if the event that is to be notified to the user does still occur. For example it may be the case that a caller of an incoming call has hung up. Another possibility is that an incoming SMS or other message caused the modification. In such a case it will be sufficient to perform the modification for limited time only, and automatically stop it after that. In both cases, that is, the event has ended, the process continues with step 116, with the termination of the modification, and returns to step 104.

If in step 114 it is detected that the event still occurs, that is, e.g. the caller is still trying to reach the user, it is checked if a pre-determined time span has elapsed (in step 118). If a user does not react within a reasonable time span to the notification it is likely that he is not able and/or willing to deal with the event right now. In this case it will be advantageous to end the modification automatically after a reasonable time span. The process then moves from step 118 to step 116 and is continued as already described.

Figure 3:
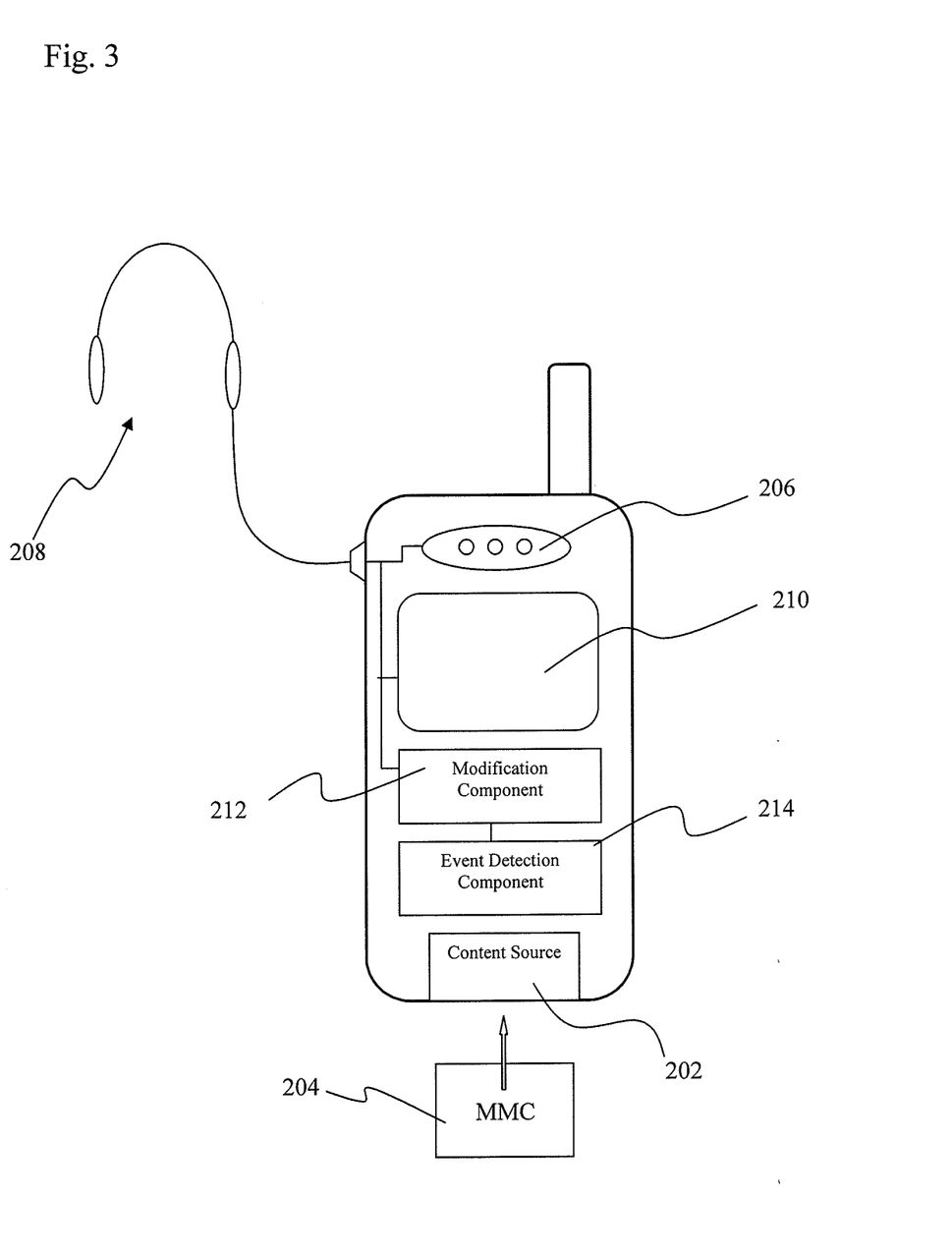
FIG. 3 is a schematic view of the device according to an embodiment of the invention.

FIG. 3 is a schematic view showing essential components of a device according to the invention. In the figure this device is shown as a mobile phone, however, there are many other (mobile) electronic devices possible within the scope of the invention, like PDAs or smartphones. The device comprises a content source 202 for providing multimedia content. This can for example be an MMC-slot for receiving an MMC card 204 on which a number of mp3 tracks are stored, a hard disk drive or internal flash memory. The content source can also be any other multimedia content source, for example a DVB-T receiver, some other video content source, or also a hardware for providing a computer game.

The device further comprises at least one reproduction component, whereof here three typical examples are depicted, that is, a loudspeaker 206 and a set of earphones 208 for reproducing audio content, and a display unit 210 for reproducing visual content in any suitable form. Such reproduction components can naturally be combined, like earphones and display for watching a video and listening to the respective audio. An event detection component 214 is provided, which is adapted for detecting events like incoming calls, messages, changes in device-related operating conditions like leaving the coverage area of a mobile network, or the battery level dropping below a threshold. The detection component 214 is thus only depicted schematically here, in practice it can be partly of fully integrated into the hardware of the device (main controller or like).

This detection component 214 is connected with a modification component 212, which responds to any occurring event by performing an according modification the multimedia output. To achieve this it is connected with one or all of the reproduction components 206, 208, 210. Depending on the particular embodiment the modification component 212 is either connected as an additional module, or it is used to loop any multimedia content through it. In the latter case the modification component 212 will comprise at least two modes, one in which all content is looped through without any modification at all, and one in which the modification is performed on the content. Looping through all content will particularly apply to the cases wherein the modification component 212 is partly implemented in a DSP or other processing hardware that is used for other purposes in the electronic device as well.

There are different ways of performing the modification according to the present invention. For an audio track the following modifications are conceivable, though it will be understood that the present invention is not limited to them:

Performing a volume modulation to the left and the right channel (assuming that the music is reproduced by a stereo headset or like), such that minimal/maximal volume is alternatingly reached in the left channel and the right channel. That is, for the listener it will appear as the music source is shifting from left to right channel and back again.

Performing a sinusoidal volume modulation ("wave-like" effect)

Gain modulation (tremolo)

Pitch modulation (vibrato)

Performing filtering like flanger, reverb or like

Changing the 3D positioning (sound source changing from left to right/front to back/circling around the listener)

Performing an A-B repetition of a portion of the title (like last 3 seconds or like)

Adding a percussion that is synchronized with the track being played back (beat-synchronized drum sequence or like)

As an alternative the regular ring tone can be "mixed into" the currently played title, that is, the regular ring tone is adjusted to fit certain characteristics of the current title. This will entail e.g. to adjust the tempo of the ring tone. The ring tone is then played "on top" of the current title. It is also possible to "blend in" the ring tone without interruption; that is, adapting the ring tone to the currently played title and then smoothly blending in the ring tone and blending out the current audio track. If the user rejects an incoming call or otherwise indicates that he is not willing to deal with the notified event right now this can naturally be done vice versa. In order to achieve that, it is essential to analyze the characteristics of a title that is currently being played back.

The information that may thus be gained about the music may include:

timbral or spectral data temporal or metrical information, such as the beats pitch information, such as pitch chroma.

loudness

A pitch chroma is a "sound class vector". Other psychoacoustic properties can be used in order to make the notification both clearly noticeable but not disturbing. For example a masking curve can easily be determined according to known procedures, and the level of a mixed-in ring tone can then be adjusted to just exceed this mask curve by a pre-determined value. The metrical information can be used to adjust the tempo of a ring or alert tone. It is also possible to transpose alert tones to the same key as a currently played title.

As an example, signal processing can be applied to the music that separate the drum sounds from the melodic sounds. Now, one example of call notification is to filter out the melodic sounds at the time of an incoming call, and to apply a different melody on top of the percussions from the background song. This way the temporal structure of the music flow would remain intact (and it is possible to resume the music without a corresponding interruption of the flow when a call has been refused or hung up), but the call would be clearly audible. In advanced embodiments one could e.g. have a rap sequence inserted like "Yo, you have a call, answer now!" that is played in tempo sync with the percussions from the original song. It is within the scope of the present invention to have a number of such stored notification audio samples. It is thus possible to store a variety of different such samples for a wide number of types of music, like certain drum sequences, guitar/saxophone solos or other suitable musical pieces, or variations of the above mentioned rap sample, that is, small voice announcement belonging to different music genres.

In another aspect of the invention the ring tone is played on top of the music playing on the background. However, the ring tone melody is tuned according to the characteristics of the music playing in the background. This can mean e.g. adjusting the tempo of the ring tone to be the same as the tempo of the music playing on the background, and starting the alert tone at a time instant corresponding to the start of a bar in the background music. As an example a beat-synchronized drum sequence can be played on top of the background music.

As an example, information on the sound timbre and loudness can be used to tune the alert tone such that it will be audible, but not too much to cause a disturbance. For example, a masking curve can be calculated from the spectrum of the background music, and the level of the alert tone adjusted such that it just exceeds the masking threshold. The metrical information of the background music is used to adjust the alert tone to the tempo of the background music. Alert tones could also be transposed to the same key as the background music.

There are a number of events the present invention can be used to notify the user of. Without constituting any restriction of the invention these might be:
  incoming voice call
  incoming SMS message, email, MMS or like
  device status related events, like battery level dropping below safety threshold, mobile phone leaving/entering coverage area of a mobile network
  pre-programmed alarm events, like mother's birthday, deadlines, appointments coming up etc.

It is of course possible with the present invention to allocate different urgency profiles to certain events, and to select a "noticeability" value accordingly (see e.g., block 107 of FIG. 2). For example an incoming SMS could have allocated a low priority, meaning that a notification is performed for a short time only and with lower noticeability (see e.g., blocks 106, 107, and 108 of FIG. 2). An incoming phone call could have allocated a higher priority such that the notification is played back as long as the user reacts. The event of the battery level falling below a pre-set level can be allocated another priority, selected according to the user's wishes.

In some cases, it is desirable to make the alert tones more audible. For example, if the user has urgency profiles for the contacts in his/her phonebook the most urgent incoming calls would be notified with more audible alert tones. It would be desirable to implement the alerting method such that the more urgent the incoming call is the more audible is the alert tone. That is, callers with low priority would be notified with barely audible modifications to the background music, whereas callers with high priority are alerted with major modifications to the background music.

The method of the invention can be applied to any alert tones in electronic device for reproducing multimedia content of some kind. For example, reporting a lowering battery level could be done by pitch shifting downwards the music playing on the background. This would be quite intuitive to a user as it appears as if the power is draining out since the music is getting slower and low-pitched, as it did actually happen in former tape-based audio players.

While the invention has been described mainly in conjunction with playing back music it can as well be applied to any other multimedia content being reproduced on an electronic device. Conceivable multi media contents may include a video/TV broadcast (e.g. one of the upcoming DVB standards for mobile devices) or a computer game.

The invention can be extended to modifying several other kinds of multimedia content as well. For example when watching TV on a mobile handset the sound could be modified (as described above) or, when no music is present, the voice tone of a speaker could be imitated/synthesized to announce the call alert. Likewise, the image contents can be modified, e.g. by writing a notification of the call to a wall (or any other larger area containing substantially the same color) in the TV program. The same applies to other applications as well, e.g. gaming. A game character could be generated or manipulated to speak to a user and announce the call, or a message can be written on a wall (by manipulating the respective textures) informing the user about the incoming call.

Also a computer game running on an electronic device can be modified in various ways, including performing any audio and/or video modification as already described above. Other possibilities are to change certain wall textures to be replaced by a suitably adapted text notification, e.g. mimicking a graffiti reading "call for you" or like. Depending on the gaming environment it may also be possible to introduce a phone box into the gaming environment, and to offer the player to use this phone box to answer a call/pause the game.

An additional character can be introduced into the game, like a guy walking by saying that a phone call is waiting for the user. A plane can be added transporting a banner reading "SMS received". An advertisement on a bus driving can be altered to read "remember mom's birthday" or like. There are many ways the skilled person will be aware of for more or less subtly altering a gaming environment to perform a notification according to the invention.

The invention claimed is:

1. A method comprising:
   causing reproduction of multimedia content on an electronic device;
   detecting an event that requires notification of a user of said electronic device; and responsive thereto
   applying a modification to said reproduction of said multimedia content, according to said event, wherein the modification is based at least in part on the event and the multimedia content being reproduced, wherein said modification comprises embedding a user-perceivable variation in said reproduced multimedia content without interrupting the reproduction of the multimedia content, wherein, in an instance in which the multimedia content comprises audio content, said modification comprises at least one of:
   amplitude modulation;
   pitch modulation;
   tempo modulation;
   adding a reverb effect to said audio content;
   manipulating an existing reverb effect of said audio content, or
   adding a stereo or surround effect to said audio content.

2. Method according to claim 1, wherein, in an instance in which the multimedia content comprises audio content, said modification comprises:
   analyzing properties of said audio content;
   adapting a notification-related audio content according to said analyzed properties; and
   adding the adapted notification-related audio content to said reproduction of said audio content.

3. Method according to claim 2, wherein said analyzed properties comprise at least one of
   the tempo of said audio content;
   the pitch of said audio content;
   the volume of said audio content; or
   the spectral distribution of said audio content.

4. Method according to claim 2, wherein adapting said notification-related audio content comprises
   calculating a masking curve of said audio content; and
   adapting the level of said notification-related audio content to exceed said masking curve by a pre-determined value.

5. Method according to claim 1, wherein, in an instance in which the multimedia content comprises video content, said modification comprises adding a visual notification to said video content, according to said event.

6. Method according to claim 5, wherein said visual notification comprises a manipulation of at least one of
the color of said video content;
the brightness of said video content; or the contrast of said video content.

7. Method according to claim 5, wherein, in an instance in which the multimedia content comprises video content, said modification comprises:
analyzing said video content to detect contiguous faces comprising a substantially uniform color; and
adding said visual notification within said detected faces.

8. Method according to claim 1, wherein, in an instance in which said multimedia content comprises a computer game, said modification comprises a manipulation and/or generation of game objects according to said event.

9. Method according to claim 8, wherein said computer game uses textures, and wherein said manipulation comprises exchanging textures with textures representing a visual notification according to said event.

10. Method according to claim 1, wherein said event is an incoming call or an incoming message.

11. Method according to claim 10, further comprising terminating said modification of said reproduction of said multimedia content when said incoming call is hung up or refused.

12. Method according to claim 1, wherein said event is a change in an operation condition of said electronic device.

13. Method according to claim 12, wherein said electronic device is a battery-powered device and wherein said change in an operation condition is the battery capacity falling below a predetermined threshold.

14. Computer program product comprising a non-transitory computer readable medium having program code portions stored thereon, the program code portions being configured when run on a computer or network device, to:
cause reproduction of multimedia content on an electronic device;
detect an event that requires notification of a user of said electronic device; and
responsive thereto
apply a modification to said reproduction of said multimedia content, according to said event, wherein the modification is based at least in part on the event and the multimedia content being reproduced, wherein said modification comprises embedding a user-perceivable variation in said reproduced multimedia content without interrupting the reproduction of the multimedia content, wherein, in an instance in which the multimedia content comprises audio content, said modification comprises at least one of:
amplitude modulation;
pitch modulation;
tempo modulation;
adding a reverb effect to said audio content;
manipulating an existing reverb effect of said audio content, or
adding a stereo or surround effect to said audio content.

15. An apparatus comprising a processor and a memory including computer program code, the memory and the computer program code configured to, with the processor, cause the apparatus to:
cause reproduction of multimedia content on an electronic device;
detect an event that requires notification of a user of said electronic device; and
responsive thereto
apply a modification to said reproduced multimedia content, according to said event, wherein the modification is based at least in part on the event and the multimedia content being reproduced, and wherein said modification comprises embedding a user-perceivable variation in said reproduced multimedia content without interrupting the reproduction of the multimedia content, wherein, in an instance in which the multimedia content comprises audio content, said modification comprises at least one of:
amplitude modulation;
pitch modulation;
tempo modulation;
adding a reverb effect to said audio content;
manipulating an existing reverb effect of said audio content, or
adding a stereo or surround effect to said audio content.

16. The apparatus according to claim 15, wherein, in an instance in which said multimedia content comprises audio content, the memory and the computer program code are further configured to, with the processor, cause the apparatus to:
cause analyzing of properties of said audio content; and
cause adapting of notification-related audio content according to said analyzed properties; and
cause adding of the adapted notification-related audio content to said reproduction of said audio content.

17. The apparatus according to claim 16, wherein the memory and the computer program code are further configured to, with the processor, cause the apparatus to calculate a masking curve of said audio content; and cause adapting of the level of said notification-related audio content to exceed said masking curve by a predetermined value.

18. The apparatus according to claim 15, wherein, in an instance in which said multimedia content comprises video content, the memory and the computer program code are further configured to, with the processor, cause the apparatus to cause adding of a visual notification to said video content, according to said event.

19. The apparatus according to claim 18, wherein the memory and the computer program code are further configured to, with the processor, cause the apparatus to cause performing of a manipulation of at least one of
color,
brightness, or
contrast of said video content, according to said event.

20. The apparatus according to claim 18, wherein the memory and the computer program code are further configured to, with the processor, cause the apparatus to cause analyzing of said video content to detect contiguous faces comprising a substantially uniform color; and cause adding of said visual notification within said detected faces.

21. The apparatus according to claim 15, wherein, in an instance in which said multimedia content comprises a computer game, the memory and the computer program code are further configured to, with the processor, cause the apparatus to cause performing of a manipulation and/or generation of game objects according to said event.

22. The apparatus according to claim 21, wherein said computer game uses textures, and wherein the memory and the computer program code are further configured to, with the processor, cause the apparatus to cause exchanging of textures with textures representing a visual notification according to said event.

23. The apparatus according to claim 15, wherein the memory and the computer program code are further configured to, with the processor, cause the apparatus to detect an incoming call or an incoming message.

24. The apparatus according to claim 23, wherein the memory and the computer program code are further configured to, with the processor, cause the apparatus to cause terminating of said modification of said reproduction of said multimedia content when said incoming call is hung up or refused.

25. The apparatus according to claim 15, wherein the memory and the computer program code are further configured to, with the processor, cause the apparatus to detect a change in an operation condition of said electronic device.

26. The apparatus according to claim 25, wherein said electronic device is a battery-powered device and wherein the memory and the computer program code are further configured to, with the processor, cause the apparatus to detect when the battery capacity falls below a predetermined threshold.

27. An apparatus comprising a processor and a memory including computer program code, the memory and the computer program code configured to, with the processor, cause the apparatus to:
 detect events requiring a notification of a user of an electronic device; and
 apply, in response to detecting an event, a modification to multimedia content that is otherwise to be reproduced, wherein the modification is based at least in part on the event and the multimedia content being reproduced, wherein the modification comprises embedding a user-perceivable variation in said multimedia content to be reproduced without interrupting the reproduction of the multimedia content, wherein, in an instance in which the multimedia content comprises audio content, said modification comprises at least one of:
 amplitude modulation;
 pitch modulation;
 tempo modulation;
 adding a reverb effect to said audio content;
 manipulating an existing reverb effect of said audio content, or
 adding a stereo or surround effect to said audio content.

28. A method comprising:
 causing reproduction of multimedia content on an electronic device;
 detecting an event that requires notification of a user of said electronic device;
 determining a priority level associated with the event; and
 applying a modification to said reproduction of said multimedia content, according to said event, wherein the modification is based at least in part on the event, the determined priority level, and the multimedia content being reproduced, wherein said modification comprises embedding a user-perceivable variation in said reproduced multimedia content without interrupting the reproduction of the multimedia content.

29. An apparatus comprising:
 a processor; and
 a memory including computer program code, the memory and the computer program code configured to, with the processor, cause:
 reproduction of multimedia content on an electronic device;
 detection of an event that requires notification of a user of said electronic device;
 determination of a priority level associated with the event; and
 application of a modification to said reproduced multimedia content, according to said event, wherein the modification is based at least in part on the event, the determined priority level, and the multimedia content being reproduced, and wherein said modification comprises embedding a user-perceivable variation in said reproduced multimedia content without interrupting the reproduction of the multimedia content.

\* \* \* \* \*

UNITED STATES PATENT AND TRADEMARK OFFICE
CERTIFICATE OF CORRECTION

PATENT NO.        : 8,452,344 B2                                                                Page 1 of 1
APPLICATION NO.   : 12/064749
DATED             : May 28, 2013
INVENTOR(S)       : Eronen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this
Eighth Day of September, 2015

Michelle K. Lee
*Director of the United States Patent and Trademark Office*